April 11, 1944.　　　　E. F. ABER　　　　2,346,343
MILLING CUTTER
Filed Feb. 27, 1943
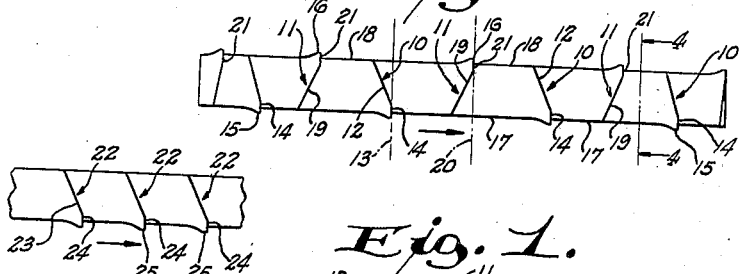
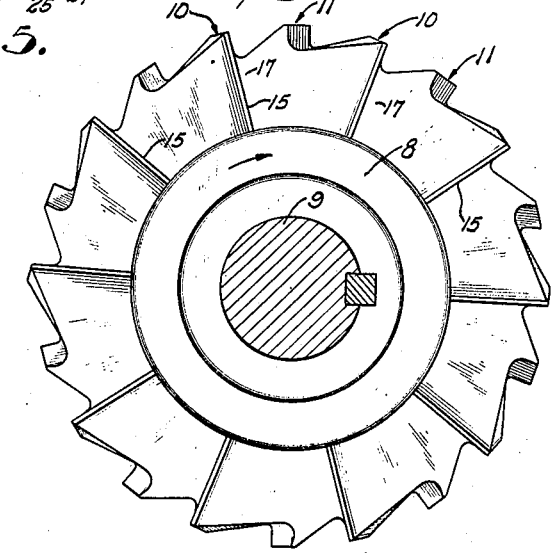
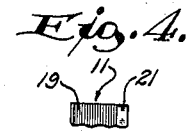
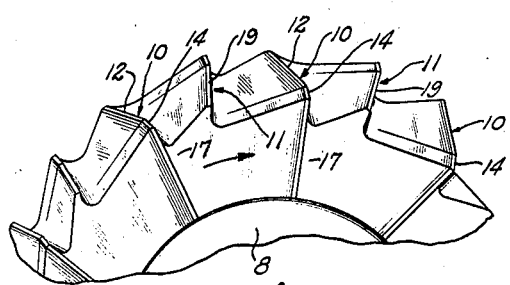
INVENTOR.
Earnest F. Aber
BY Morsell & Morsell
ATTORNEYS Patented Apr. 11, 1944

2,346,343

UNITED STATES PATENT OFFICE 2,346,343

MILLING CUTTER

Earnest F. Aber, Waterford, Wis.

Application February 27, 1943, Serial No. 477,412

12 Claims. (Cl. 29—103)

This invention relates to improvements in milling cutters.

Heretofore circular milling cutters have been formed with teeth having straight cutting edges extending at an angle transversely of the periphery of the cutter. They have also been formed with teeth having peripheral cutting edges which extend at alternate right- and left-hand angles. The angles of the cutting edges form acute angles with respect to a line across the periphery of the cutter which is parallel to the axis of rotation of the cutter, and these cutting edges extend at the same angle from one side of the cutter to the other. Furthermore, the leading ends of these angular peripheral cutting edges meet side cutting edges, on certain types of cutters, and project laterally a short distance from an undercut side portion of the cutting wheel. Thus, during use, there is a great strain imposed upon these leading ends of the peripheral cutting edges, with the result that these corner portions of the teeth are subjected to excessive wear and frequently break off.

It is therefore a general object of the present invention to obviate the above mentioned objections by providing a milling cutter of the class described wherein strains on the corners of the teeth are minimized without affecting the efficiency of the cutter.

A more specific object of the invention is to provide a milling edge cutter of the class described wherein a portion of the length of a peripheral cutting edge is at an angle transversely of the periphery of the blank and wherein said angular portion joins another peripheral cutting edge portion at the projecting corner, which is approximately parallel to the axis of rotation of the cutter, or which is at least nearer to parallel than the before-mentioned angular cutting edge portion. Thus, during use, strains on the leading ends of the peripheral cutting edges are minimized and a very effective type of cut is produced.

A further object of the invention is to provide a construction as above described, which is applicable for use in a staggered toothed side milling cutter having peripheral cutting edges which are at alternate right- and left-hand angles. When the improved construction is embodied in this type of cutter, those corner portions of the peripheral cutting edges which are approximately parallel to the axis of rotation of the cutter, alternate in position from one side of the cutter to the other.

A further object of the invention is to provide a milling cutter as above described wherein the portion of each peripheral cutting edge which is approximately parallel to the axis of rotation is preferably but a minor portion of the length of the entire peripheral cutting edge.

With the above and other objects in view, the invention consists of the improved milling cutter, and all its parts and combinations as set forth in the claims, and all equivalents thereof. In the accompanying drawing illustrating preferred embodiments of the invention, in which the same reference numerals designate the same parts in all of the views, Fig. 1 is a side view of the improved cutting wheel;

Fig. 2 is a view looking at the periphery thereof;

Fig. 3 is a fragmentary perspective view;

Fig. 4 is a fragmentary detail view of a cutting edge, taken approximately on the line 4—4 of Fig. 2; and Fig. 5 is a fragmentary peripheral view similar to Fig. 2, showing the invention applied to another type of cutter.

Referring more particularly to the drawing, the improved cutter is formed of any suitable metal or alloy and comprises a circular blank 8 having a central opening 9.

Referring more particularly to Fig. 2, there are cutting edges 10 which extend at a left-hand angle, and alternate cutting edges 11 which extend at a right-hand angle. Each cutting edge 10 has a part 12 which extends at an acute angle with respect to a line 13 which is parallel to the axis of rotation of the cutter. The part 12 meets another peripheral cutting edge part 14 which is at an obtuse angle with respect to the part 12. In addition the part 14 is preferably parallel to the axis of rotation of the cutter. The part 14 is at the leading end of the peripheral cutting edge 10, referring to the direction of rotation of the cutting wheel during use.

Where side cutting edges, such as the side cutting edges 15 on one side and 16 on the other side, are employed, the side of the cutter blank is undercut as at 17 and 18 so that the peripheral cutting edge portions 14 join with the side cutting edges 15 and in effect form projections from the side of the cutter as is clear from Fig. 2. In the usual type of spiral cutter or staggered toothed cutter, where the peripheral cutting edges have the same angle throughout their length, there is considerable wear on these leading edge corners, and breakage frequently occurs. With the present invention, due to the use of the peripheral cutting edge portions 14, which are approximately parallel to the axis of rotation, these portions meet the work throughout the length of the portions 14 so that all of the strain is not imposed on a projecting corner point.

In the case of a staggered toothed cutter, such as the type illustrated in Figs. 1, 2, and 3, the alternate cutting edges 11 are the reverse of the cutting edges 10 just described. The cutting edges 11 have a part 19 which is at an angle with respect to an imaginary line 20 extending parallel to the axis of rotation. Each peripheral cutting edge 11 has another part 21 corresponding to the parts 14 of the cutting edges 10 which is aproximately parallel to the axis of rotation. The peripheral cutting edge parts 21 join with the side cutting edges 16 on the opposite side of the blank and project beyond the undercut portions 18.

It is preferred that the cutting edge portions 14 and 21 be of approximately the length illustrated and but a minor portion of the total length of the peripheral cutting edges 10 and 11.

The invention is also applicable to the non-staggered spiral toothed cutter of the type shown in Fig. 5, wherein the cutting peripheral edges 22 all extend in the same angular direction. In this form of the invention each cutting edge portion 22 has a part 23 which extends at an angle with respect to a line parallel to the axis of rotation, and another part 24 which extends approximately parallel to the axis of rotation. In the form of the invention of Fig. 5, all of the parts 24 are on the same side of the blank and join with the side cutting edges 25.

In the use of the improved cutting wheel, when it is rotated in the direction indicated by the arrows, the work will first be engaged by the portions 14 and 21 of Fig. 2, or the portions 24 of Fig. 5. Inasmuch as these portions are preferably parallel to the axis of rotation, the work will be engaged simultaneously throughout the length of said portions 14, 21, or 24. Thus initial strains will not be concentrated on the extreme projecting corners, which is particularly undesirable in the types of cutters illustrated. After the work has been engaged by the parts 14, 21 or 24, then the work will subsequently be engaged by the angular cutting edge portions 12, 19, or 23. Thus a most efficient cutting operation will result and the cutter will be capable of use for a maximum period of time without having its efficiency impaired by unduly worn or broken corners.

Various changes and modifications may be made, as well as other adaptations, without departing from the spirit of the invention, and all of such changes and adaptations are contemplated as may come within the scope of the claims.

What I claim is:

1. A circular milling cutter having a transverse cutting edge on its periphery adapted to cut upon rotation of the cutter, which has a part extending at an angle with respect to a line parallel to the axis of rotation of the cutter when viewing the periphery of the cutter, said cutting edge having another peripheral part forming a continuation of said first part and extending to the leading corner of the peripheral cutting edge and which is at an obtuse angle with respect to the first mentioned part of the peripheral cutting edge when viewing the periphery of the cutter.

2. A circular milling cutter having a transverse cutting edge on its periphery adapted to cut upon rotation of the cutter, which has a part extending at an angle with respect to a line parallel to the axis of rotation of the cutter when viewing the periphery of the cutter, said cutting edge having another peripheral part forming a continuation of said first part and extending to the leading corner of the peripheral cutting edge and which is approximately parallel to the axis of rotation of the cutter when viewing the periphery of the cutter.

3. A circular milling cutter having a transverse cutting edge on its periphery, which has a part constituting a major portion of the length of said cutting edge extending at an angle with respect to a line parallel to the axis of rotation of the cutter, said cutting edge having another peripheral part extending to the leading corner of the peripheral cutting edge which is at an obtuse angle with respect to the first mentioned part of the peripheral cutting edge.

4. A circular milling cutter having a transverse cutting edge on its periphery adapted to cut upon rotation of the cutter, which has a part constituting a major portion of the length of said cutting edge extending at an angle with respect to a line parallel to the axis of rotation of the cutter when viewing the periphery of the cutter, said cutting edge having another peripheral part forming a continuation of said first part and extending to the leading corner of the peripheral cutting edge and which is approximately parallel to the axis of rotation of the cutter when viewing the periphery of the cutter.

5. A circular milling cutter having transverse cutting edges on its periphery, parts of which extend alternately at right- and left-hand angles with respect to a line parallel to the axis of rotation of the cutter, each peripheral cutting edge having another part extending to the leading corner of said peripheral cutting edge which is at an obtuse angle with respect to the first mentioned part of the peripheral cutting edge.

6. A circular milling cutter having transverse cutting edges on its periphery adapted to cut upon rotation of the cutter, parts of which extend alternately at right- and left-hand angles with respect to a line parallel to the axis of rotation of the cutter when viewing the periphery of the cutter, each peripheral cutting edge having another part forming a continuation of said first part and extending to the leading corner of said peripheral cutting edge and which is approximately parallel to the axis of rotation of the cutter when viewing the periphery of the cutter.

7. A circular milling cutter having transverse cutting edges on its periphery, major parts of the length of which extend alternately at right- and left-hand angles with respect to a line parallel to the axis of rotation of the cutter, each peripheral cutting edge having another part extending to the leading corner of said peripheral cutting edge which is at an obtuse angle with respect to the first mentioned part of the peripheral cutting edge.

8. A circular milling cutter having transverse cutting edges on its periphery adapted to cut upon rotation of the cutter, major parts of the length of which extend alternately at right- and left-hand angles with respect to a line parallel to the axis of rotation of the cutter when viewing the periphery of the cutter, each peripheral cutting edge having another part forming a continuation of said first part and extending to the leading corner of said peripheral cutting edge and which is approximately parallel to the axis of rotation of the cutter when viewing the periphery of the cutter.

9. A circular side milling cutter having a laterally projecting side cutting edge, said cutter also having a cutting edge on its periphery, the major part of the length of which extends at an angle with respect to a line parallel to the axis of rotation of the cutter, said peripheral cutting edge also having another part extending to the leading corner and meeting the side cutting edge, said last mentioned part being at an obtuse angle with respect to the first mentioned part of the peripheral cutting edge.

10. A circular side milling cutter having a laterally projecting side cutting edge, said cutter also having a cutting edge on its periphery, the major part of the length of which extends at an angle with respect to a line parallel to the axis of rotation of the cutter, said peripheral cutting edge also having another part extending to the leading corner and meeting the side cutting edge, said last mentioned part being approximately parallel to the axis of rotation of the cutter.

11. A circular side milling cutter having laterally projecting side cutting edges on both sides of the cutter, said cutter also having cutting edges on its periphery, major parts of which extend alternately at right- and left-hand angles with respect to a line parallel to the axis of rotation of the cutter, each peripheral cutting edge having another part extending to the leading corner and meeting a side cutting edge, said last mentioned part being at an obtuse angle with respect to the first mentioned part of the peripheral cutting edge.

12. A circular side milling cutter having laterally projecting side cutting edges on both sides of the cutter, said cutter also having cutting edges on its periphery, major parts of which extend alternately at right- and left-hand angles with respect to a line parallel to the axis of rotation of the cutter, each peripheral cutting edge having another part extending to the leading corner and meeting a side cutting edge, said last mentioned part being approximately parallel to the axis of rotation of the cutter.

EARNEST F. ABER.